United States Patent
Ramos et al.

(10) Patent No.: US 11,537,985 B2
(45) Date of Patent: Dec. 27, 2022

(54) ANONYMOUS INVENTORY TRACKING SYSTEM

(71) Applicant: International Business Machines Corporation, Armonk, NY (US)

(72) Inventors: Igor S. Ramos, Round Rock, TX (US);
Kimberly J. Taft, Austin, TX (US);
Angelo Danducci, II, Austin, TX (US);
Devon E. Mensching, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 16/583,742

(22) Filed: Sep. 26, 2019

(65) Prior Publication Data

US 2021/0097484 A1 Apr. 1, 2021

(51) Int. Cl.
*G06Q 10/08* (2012.01)
*G06K 9/62* (2022.01)
*G06V 20/10* (2022.01)

(52) U.S. Cl.
CPC ....... *G06Q 10/0875* (2013.01); *G06K 9/6201* (2013.01); *G06V 20/10* (2022.01)

(58) Field of Classification Search
CPC .............. G06Q 10/087; G06Q 10/0875; H04L 63/0421
See application file for complete search history.

(56) References Cited

U.S. PATENT DOCUMENTS

| | | | | |
|---|---|---|---|---|
| 8,768,107 | B2 * | 7/2014 | Flynn | G06V 20/20 |
| | | | | 382/305 |
| 2013/0217332 | A1 * | 8/2013 | Altman | G01S 1/02 |
| | | | | 455/3.01 |
| 2015/0294333 | A1 * | 10/2015 | Avegliano | G06Q 10/06315 |
| | | | | 705/7.31 |
| 2016/0277435 | A1 * | 9/2016 | Salajegheh | H04W 12/12 |
| 2016/0350708 | A1 | 12/2016 | Jones et al. | |
| 2016/0350787 | A1 | 12/2016 | Taylor et al. | |
| 2018/0121721 | A1 | 5/2018 | Garcia et al. | |

(Continued)

FOREIGN PATENT DOCUMENTS

EP 1436742 A1 7/2004
WO 2012125960 A2 9/2012

OTHER PUBLICATIONS

"INFOhio SirsiDynix K12 Manual", 2010, available at https://www.access-k12.org/cms/lib03/oh16000618/centricity/domain/19/sirsi_manual_2010-09_singlesided.pdf (Year: 2010).*

(Continued)

*Primary Examiner* — Allen C Chein
(74) *Attorney, Agent, or Firm* — Stephanie L. Carusillo

(57) ABSTRACT

In an approach to anonymous inventory tracking, one or more computer processors receive a first image of one or more products from a user. The one or more computer processors remove data associated with an identity of the user from the first image. The one or more computer processors determine that a storage location associated with the one or more products in the first image is detected. The one or more computer processors determine an inventory count of the one or more products in the first image. The one or more computer processors submit the first image and the inventory count of the one or more products in the first image to a blockchain ledger in association with the storage location. The one or more computer processors take an action based on the inventory count.

17 Claims, 3 Drawing Sheets

(56) References Cited

U.S. PATENT DOCUMENTS

2018/0144292 A1* 5/2018 Mattingly ............. G06F 16/903
2018/0264347 A1* 9/2018 Tran ........................ G06F 1/163

OTHER PUBLICATIONS

"Inventory Basic—How to Name Your Inventory Locations", Clearly Inventory, Printed Jul. 22, 2019, 11 pages, <https://www.clearlyinventory.com/inventory-basics/how-to-name-inventory-locations>.

* cited by examiner

ANONYMOUS INVENTORY TRACKING SYSTEM

BACKGROUND OF THE INVENTION

The present invention relates generally to the field of image analysis, and more particularly to inventory tracking via anonymous crowdsourcing.

Retailers, wholesalers, and other product distributors typically maintain an inventory of various items that may be ordered, purchased, leased, borrowed, rented, viewed, etc., by clients or customers. Product inventory is the quantity of a particular product that is available for use or sale. Related information may include pricing, storage location, etc. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can locate items from within the store, pick the items from inventory, and take them to a cashier for purchase, rental, etc. Inventory tracking records the inventory levels over time. Inventory tracking can yield insights such as product consumption and sales trends, as well as when to order more of a product.

Crowdsourcing can be defined as the process of obtaining needed services, ideas, or content by soliciting contributions from a large group of people, and especially from an online community. Crowdsourcing often consists of a person or entity broadcasting a problem to the public and an open call for contributions to solving the problem. Members of the public submit solutions which are then owned by the entity which broadcasted the problem.

Smart contracts are computer programs that both express the contents of a contractual agreement and operate the implementation of the content, based on triggers provided by users of a smart contract or extracted from a blockchain environment. Smart contracts may have a user interface and often emulate the logic of contractual clauses. Smart contracts aim to provide security superior to traditional contract law and to reduce other transaction costs associated with contracting. Within the context of blockchain, smart contracts are scripts stored on the blockchain. Since they reside on the chain, smart contracts have a unique address. A smart contract is triggered by messages or transactions sent to its address.

SUMMARY

Embodiments of the present invention disclose a method, a computer program product, and a system for anonymous inventory tracking. The method may include one or more computer processors receiving a first image of one or more products from a user. The one or more computer processors remove data associated with an identity of the user from the first image. The one or more computer processors determine that a storage location associated with the one or more products in the first image is detected. The one or more computer processors determine an inventory count of the one or more products in the first image. The one or more computer processors submit the first image and the inventory count of the one or more products in the first image to a blockchain ledger in association with the storage location. The one or more computer processors take an action based on the inventory count.

DETAILED DESCRIPTION

While tracking product inventory is important to businesses, installing dedicated sensors and cameras can be expensive, with little or no return on investment. Thus, storage owners in small retail or non-retail environments typically refrain from utilizing such technology to maintain an inventory count. Examples of such an environment may include company-owned shared resources such as a refrigerator, an office supplies cabinet, or a storage rack of electronic components for building electronic prototypes. Tracking the inventory of such items may result in positive outcomes, such as improved productivity and employee satisfaction when the company is informed of, for example, which items are used more often and when the items are close to depletion, or which items have become stale having been on the shelf too long. In another scenario, a company may want to track the inventory of the company's competitor but would not have permission to install sensing infrastructure.

Embodiments of the present invention recognize that cost-effective product inventory tracking without employing sensing infrastructure can be realized by using an anonymous crowdsourcing approach to track inventory which preempts the need for a dedicated sensing infrastructure. Embodiments of the present invention utilize images captured by users whose identity is removed from the images using blockchain technology capable of user de-identification to determine product inventory. Embodiments of the present invention enable a user to check whether an item is in stock in an environment that typically does not publish inventory counts. Embodiments of the present invention enable a user to view an aggregation of inventory counts of multiple associated storage locations, such as multiple office supply cabinets in a place of work, in a single application display. Embodiments of the present invention enable a user to find a product across multiple locations. Embodiments of the present invention enable a user to understand product consumption. Embodiments of the present invention may also enable a user to easily perform a competitive analysis. Embodiments of the present invention may also enable crowdsourced price matching. Implementation of embodiments of the invention may take a variety of forms, and exemplary implementation details are discussed subsequently with reference to the Figures.

Figure 1:
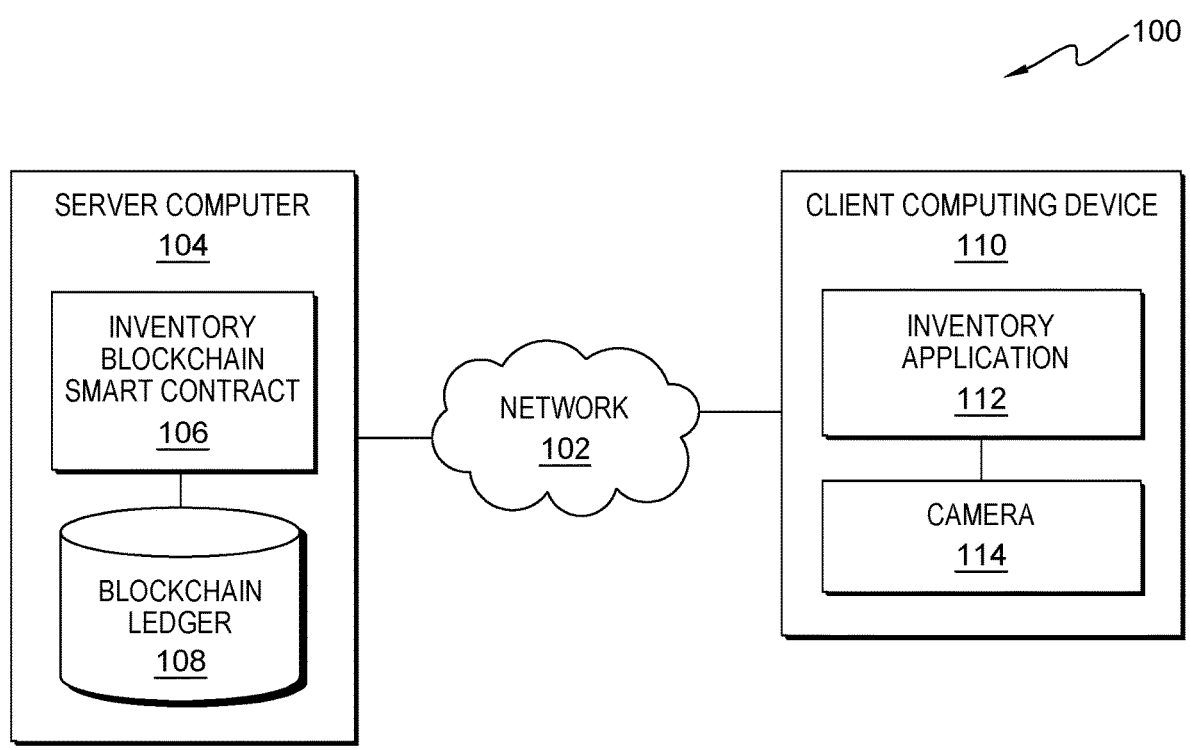
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104 and client computing device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes inventory blockchain smart contract 106 and blockchain ledger 108. Server computer 104 may include internal and external hardware components, as depicted and described in further detail with respect to FIG. 3.

Inventory blockchain smart contract 106 is an inventory counting system that uses blockchain smart contract technology to crowdsource images of inventory while ensuring anonymity of user contributions and takes actions upon determining the results. Inventory blockchain smart contract 106 receives a new image of inventory and stores the image in blockchain ledger 108. Inventory blockchain smart contract 106 determines the storage location of the product depicted in the image via one or more of a plurality of techniques. Inventory blockchain smart contract 106 analyzes the image to determine an inventory count. Inventory blockchain smart contract 106 compares the inventory count of the new image to counts of a previous inventory state to determine any changes. Based on the previous inventory state, inventory blockchain smart contract 106 determines if the new inventory count is valid. If the new inventory count is valid, then inventory blockchain smart contract 106 tags the image as valid and updates the inventory count in blockchain ledger 108, otherwise inventory blockchain smart contract 106 tags the image as invalid. If inventory blockchain smart contract 106 cannot determine the location, then inventory blockchain smart contract 106 receives a location registration and determines the initial inventory count by analyzing the image. In response to storing a new or updated inventory count in blockchain ledger 108, inventory blockchain smart contract 106 takes one or more actions, based on the status of the inventory count. Inventory blockchain smart contract 106 is depicted and described in further detail with respect to FIG. 2.

Blockchain ledger 108 is one or more of a plurality of systems known in the art which can be used to store records of digital value, for example, transactions, identities, assets, documents, and properties, into an immutable ledger, or to add self-enforcing business logic to the ledger, such as smart contracts. In one embodiment, blockchain ledger 108 is permissionless, i.e., a public blockchain system open for participation to anyone. In another embodiment, blockchain ledger 108 is permissioned, i.e., a private blockchain system available only to a closed group of participants. Data within blockchain ledger 108 is encrypted and is therefore accessible via access control rules embedded into inventory blockchain smart contract 106. This provides a layer of security for user anonymity.

Client computing device 110 can be a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, client computing device 110 is an autonomous robot used to gather product and inventory data. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of inventory application 112 and camera 114.

Inventory application 112 provides an interface between inventory blockchain smart contract 106 on server computer 104 and a user of client computing device 110. In one embodiment, inventory application 112 is mobile application software. Mobile application software, or an "app," is a computer program designed to run on smart phones, tablet computers and other mobile devices. In one embodiment, inventory application 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Inventory application 112 enables a user of client computing device 110 to participate with other users of inventory blockchain smart contract 106 by providing an image of products and by learning current inventory status.

Camera 114 captures images of one or more products in a storage location for the purpose of product inventory. Camera 114 may be one of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, camera 114 includes any device capable of imaging a portion of the electromagnetic spectrum.

Figure 2:
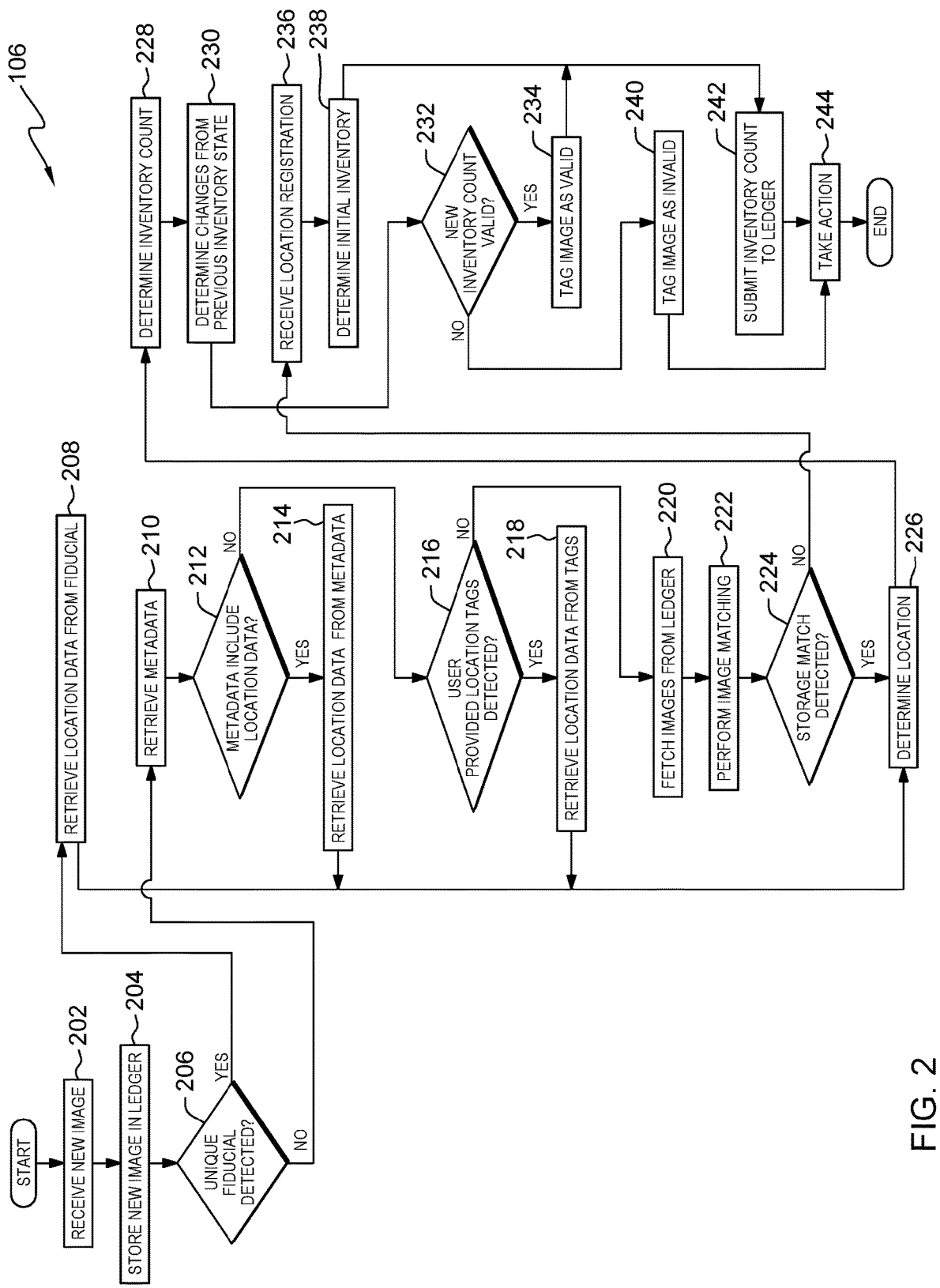
FIG. 2 is a flowchart depicting operational steps of an inventory blockchain smart contract, on a server computer within the distributed data processing environment of FIG. 1, for determining quantities and insights associated with product inventory, in accordance with an embodiment of the present invention.

FIG. 2 is a flowchart depicting operational steps of inventory blockchain smart contract 106, on server computer 104 within distributed data processing environment 100 of FIG. 1, for determining quantities and insights associated with product inventory, in accordance with an embodiment of the present invention.

Inventory blockchain smart contract 106 receives a new image (step 202). In a place of work that employs inventory blockchain smart contract 106 to estimate inventory counts of products, a user of client computing device 110 captures an image of one or more products in a storage location using camera 114. Depending on the capability of camera 114, the captured image may be a still photograph, video, and the like. When the user of client computing device 110 sends the image to inventory blockchain smart contract 106, via inventory application 112, inventory blockchain smart contract 106 receives the image of one or more products. In one embodiment, inventory blockchain smart contract 106 may continuously monitor for proximity of a device that includes inventory application 112, and if inventory blockchain smart contract 106 determines that client computing device 110 is located in a position such that camera 114 is within a threshold distance of a storage location, then inventory blockchain smart contract 106 automatically triggers camera 114 to capture an image and transmit the image to inventory blockchain smart contract 106.

Inventory blockchain smart contract 106 stores the new image in blockchain ledger 108 (step 204). In an embodiment, inventory blockchain smart contract 106 removes any metadata which may identify the user of client computing device 110 from the new image prior to storing the new image in blockchain ledger 108, in order to keep the submitted image anonymous. By making the stored image anonymous, inventory blockchain smart contract 106 prevents discovery of the submitter's identity by other users of inventory blockchain smart contract 106 when the submitter may not want to be known. For example, if a user submits an image of another user's food in the company refrigerator that has been on the refrigerator shelf for over a week, the submitter may not want the other user to know who submitted the image of the old food. Thus, having anonymity encourages users to submit images, even if they may be embarrassing or accusatory of another user. In one embodiment, inventory blockchain smart contract 106 subjects user identity metadata to a one-way, cryptographic hash function and replaces the user identity metadata with a cryptographic signature that cannot be traced back to the user. In the embodiment, the one-way hash value becomes the primary key for tracking image performance in blockchain ledger 108.

Inventory blockchain smart contract 106 determines whether a fiducial is detected in the image (decision block 206). In a first method for determining the location of the storage depicted in the new image, inventory blockchain smart contract 106 analyzes the image to determine if a unique fiducial is included in the image. For example, inventory blockchain smart contract 106 may look for a quick response (QR) code on a shelf in the image that uniquely identifies the location of the shelf.

If inventory blockchain smart contract 106 determines a fiducial is detected in the image ("yes" branch, decision block 206), then inventory blockchain smart contract 106 retrieves location data from the fiducial (step 208). Inventory blockchain smart contract 106 retrieves the location data associated with the detected fiducial. In one embodiment, the location data associated with the fiducial resides in blockchain ledger 108. In another embodiment, the location data associated with the fiducial may reside in a database within distributed data processing environment 100 (not shown) via network 102. In an embodiment, the fiducial, e.g., a QR code, may translate to an identification which points to a secondary source which contains the location data. For example, the secondary source may be blockchain ledger 108 or a database within distributed data processing environment 100 (not shown).

If inventory blockchain smart contract 106 determines a fiducial is not detected in the image ("no" branch, decision block 206), then inventory blockchain smart contract 106 retrieves metadata (step 210). Inventory blockchain smart contract 106 retrieves metadata associated with the received image. For example, the image may include global positioning system (GPS) coordinates of client computing device 110, or other location data, as would be recognized by a person of skill in the art, at the time the image was captured. Inventory blockchain smart contract 106 may also retrieve additional metadata from the image, such as the date and time the image was captured. In an embodiment, inventory blockchain smart contract 106 may also retrieve metadata from one or more sensors located in proximity to the location in which the user captured the image. In one embodiment, the sensors are located in client computing device 110. In another embodiment, the sensors may be mounted in proximity to, and therefore associated with, a storage location. In one embodiment, the mounted sensors may continuously report to inventory blockchain smart contract 106. For example, inventory blockchain smart contract 106 may also retrieve metadata from one or more micro-location sensing technologies, such as a Wi-Fi® based triangulation system. In one embodiment, inventory blockchain smart contract 106 stores metadata associated with the image in blockchain ledger 108. In another embodiment, inventory blockchain smart contract 106 may store the metadata in a database within distributed data processing environment 100 (not shown) via network 102.

Inventory blockchain smart contract 106 determines whether the retrieved metadata includes location data (decision block 212). Inventory blockchain smart contract 106 analyzes the retrieved metadata to determine whether data indicating the location of the storage depicted in the image, as discussed with respect to step 210, is included with the image. In one embodiment, inventory blockchain smart contract 106 uses geofencing to reduce the number of possible locations of the image. For example, inventory blockchain smart contract 106 may determine whether coarse-grained location metadata is available, such as the GPS coordinates of client computing device 110 which can narrow the location down to a ten-meter radius. In another example, inventory blockchain smart contract 106 may determine whether fine-grained location metadata is available, such as a beacon triangulation system, as would be recognized by a person of skill in the art, which can precisely narrow the location down to a radius of several inches.

If inventory blockchain smart contract 106 determines the retrieved metadata includes location data ("yes" branch, decision block 212), then inventory blockchain smart contract 106 retrieves location data from the metadata (step 214). Inventory blockchain smart contract 106 retrieves the location data associated with the image and the retrieved metadata.

If inventory blockchain smart contract 106 determines the retrieved metadata does not include location data ("no" branch, decision block 212), then inventory blockchain smart contract 106 determines whether user provided location tags are detected (decision block 216). In an embodiment, the user of client computing device 110 may add one or more tags to the image captured by camera 114 which can identify the location of the storage. For example, the user may add text to the image, via inventory application 112, that states "company fridge, second floor." In another embodiment, inventory application 112 may offer the user a dropdown menu from which the user can select a location from a list. In one embodiment, inventory blockchain smart contract 106 stores the user selected tags associated with the image in blockchain ledger 108. In another embodiment, inventory blockchain smart contract 106 may store the user selected tags in a database within distributed data processing environment 100 (not shown) via network 102.

If inventory blockchain smart contract 106 determines user tags are detected ("yes" branch, decision block 216), then inventory blockchain smart contract 106 retrieves location data from the user tags (step 218). Inventory blockchain smart contract 106 analyzes the one or more tags to determine the location of the storage depicted in the image.

If inventory blockchain smart contract 106 determines user tags are not detected ("no" branch, decision block 216), then inventory blockchain smart contract 106 fetches one or more images from blockchain ledger 108 (step 220). Inventory blockchain smart contract 106 fetches images from blockchain ledger 108 that were stored prior to when the new image was received. In one embodiment, inventory blockchain smart contract 106 fetches all images in blockchain ledger 108. In a further embodiment, inventory blockchain smart contract 106 may fetch a pre-defined percentage of images stored in blockchain ledger 108, for example, 50 percent. In another embodiment, inventory blockchain smart contract 106 may fetch one or more images that were previously received from client computing device 110, indicating the images are from the same user that submitted the new image, improving the likelihood that the location depicted the new image is the same as the location depicted in a previous image. In another embodiment, inventory blockchain smart contract 106 may fetch images that were submitted within a pre-defined time period, for example, images stored in blockchain ledger 108 in the last 30 days.

Inventory blockchain smart contract 106 performs image matching (step 222). Inventory blockchain smart contract 106 performs one or more image matching techniques, as would be recognized by a person with skill in the art, to match the storage location depicted in the new image to at least one other storage location depicted in an image fetched from blockchain ledger 108. In one embodiment, the image matching technique can take overlapping temporal items into account to match images. For example, two company refrigerators are the identical make and model, but one refrigerator stocks soft drinks while the employees use the other refrigerator to store lunches and snacks. An image matching technique can analyze the contents of the storage in the image to distinguish between the two refrigerators, even though physical characteristics of the two refrigerators are identical. In one embodiment, inventory blockchain smart contract 106 determines a confidence level in the image matching, where the confidence level is based on data including, but not limited to, a time of day in which the images were received, time elapsed since the stored image was received, clarity and resolution of the images, etc. In the embodiment, inventory blockchain smart contract 106 determines whether the confidence level exceeds a pre-defined threshold.

Inventory blockchain smart contract 106 determines whether a storage match to a fetched image is detected (decision block 224). Inventory blockchain smart contract 106 determines whether the new image matches a stored image, based on the image matching technique employed and the data, as described with respect to step 222. In one embodiment, inventory blockchain smart contract 106 determines whether a match is detected based on whether a confidence level exceeds a pre-defined threshold.

Responsive to retrieving location data from a fiducial, metadata, user tags, or determining a storage match to a fetched image is detected ("yes" branch, decision block 224), inventory blockchain smart contract 106 determines a location (step 226). As described above, inventory blockchain smart contract 106 uses available data retrieved by one of a plurality of techniques to determine the location depicted in the received image.

Inventory blockchain smart contract 106 determines an inventory count (step 228). Inventory blockchain smart contract 106 uses one or more image analysis techniques, as would be recognized by a person of skill in the art, to determine a count of the products depicted in the image. For example, inventory blockchain smart contract 106 may use one or more visual recognition services to analyze the image. In one embodiment, inventory blockchain smart contract 106 uses a feature extraction technique, such as a classification model, to count and detect edges of one or more objects, in order to determine the number of products depicted in the image. In one embodiment, inventory blockchain smart contract 106 determines one or more types of products are included in the inventory. For example, inventory blockchain smart contract 106 may analyze labels on products to differentiate between brands, sizes, flavors, etc., of the products in the image. In one embodiment, inventory blockchain smart contract 106 may wait until a threshold number of received images associated with a storage location are received prior to determining an inventory count in order to have sufficient data, perhaps from different angles or heights, to better represent the products and give a higher confidence in the inventory count. For example, inventory blockchain smart contract 106 may wait until five images of the same storage location are received before determining the inventory count for the storage location. In an embodiment, inventory blockchain smart contract 106 may use data from previous images of the storage location to improve the inventory count from the new image. For example, if a previous image was taken at an angle that depicted the depth of the shelf on which product was stored, then inventory blockchain smart contract 106 can better predict an inventory count from the new image, even if the new image was captured perpendicular to the products.

Inventory blockchain smart contract 106 determines changes from a previous inventory state (step 230). Inventory blockchain smart contract 106 compares the new image to one or more images of the same location stored in blockchain ledger 108 in order to perform temporal tracking. In one embodiment, if inventory blockchain smart contract 106 did not fetch images from blockchain ledger 108 in step 220, then inventory blockchain smart contract 106 fetches one or more images of the storage location for the comparison. In one embodiment, because inventory blockchain smart contract 106 determined the storage location in step 226, inventory blockchain smart contract 106 can fetch images relevant to the determined location for comparison. Inventory blockchain smart contract 106 uses one or more image analysis techniques, as would be recognized by a person of skill in the art, to compare images to determine changes to the inventory of the storage location. In one embodiment, inventory blockchain smart contract 106 compares the inventory count determined in step 228 to a previous inventory count stored in blockchain ledger 108. In another embodiment, inventory blockchain smart contract 106 compares one or more inventory types depicted in the new image to one or more inventory types depicted in one or more previously stored images. In a further embodiment, inventory blockchain smart contract 106 compares metadata associated with the new image to stored metadata associated with one or more previously stored images. By comparing the new image to one or more previously stored images, inventory blockchain smart contract 106 determines one or more changes from the previous inventory state. The temporal tracking provides insights that may include detecting instances where an item has been in the storage location for a longer period of time than permissible by a storage owner policy. For example, a company may have a policy that no personal food item can remain in the company refrigerator for more than five days. The temporal tracking may also provide insights such as detecting instances of one or more items being out of stock for a period of time.

Inventory blockchain smart contract 106 determines whether the new inventory count is valid (decision block 232). Inventory blockchain smart contract 106 validates the new inventory count prior to submitting the new count to blockchain ledger 108. In one embodiment, inventory blockchain smart contract 106 determines whether the new inventory count is valid as a result of a comparison of metadata from the new image and one or more previous images. For example, inventory blockchain smart contract 106 determines that the new image was captured only five minutes after a previous image was captured, and yet the change in inventory count or type is drastically different, e.g., the inventory types are not the same, thus inventory blockchain smart contract 106 determines the new image is not valid because inventory blockchain smart contract 106 validated the previous image prior to receiving the new image. In another example, if the comparison yields a significant difference, inventory blockchain smart contract 106 may determine that the submitter of the new image has a history of submitting invalid images, and therefore the new image is likely to be invalid. In an embodiment, inventory blockchain smart contract 106 may attribute a confidence level to the validity of the inventory count. For example, if a user of client computing device 110 historically submits images that yield an accurate inventory count, then inventory blockchain smart contract 106 can attribute a higher confidence level for images received from the user. In another embodiment, inventory blockchain smart contract 106 may determine the validity of the inventory count based on comparison of the new image to previous images. For example, inventory blockchain smart contract 106 may determine that the location tagged by the user in the new image does not match the location of previous images. The user may have typed in the location incorrectly or selected an incorrect location from a dropdown menu. Thus, the new image of the storage location does not match previously stored images of the storage location, and therefore is invalid.

If inventory blockchain smart contract 106 determines the new inventory count is invalid ("no" branch, decision block 232), then inventory blockchain smart contract 106 tags the image as invalid (step 240). Inventory blockchain smart contract 106 adds a tag to the image in blockchain ledger 108 that indicates the image is invalid. Inventory blockchain smart contract 106 cannot delete the image from blockchain ledger 108 as a deletion violates blockchain transaction policy. In addition, the presence of the invalid image provides data that inventory blockchain smart contract 106 can use in future comparisons, e.g., the submission history of the user that submitted the invalid image.

If inventory blockchain smart contract 106 determines the new inventory count is valid ("yes" branch, decision block 232), then inventory blockchain smart contract 106 tags the image as valid (step 240). Inventory blockchain smart contract 106 adds a tag to the image in blockchain ledger 108 that indicates the image is valid.

If inventory blockchain smart contract 106 determines a storage match to a fetched image is not detected ("no" branch, decision block 224), then inventory blockchain smart contract 106 receives a location registration (step 236). If inventory blockchain smart contract 106 cannot determine the location of the depicted storage via any of the described techniques, then inventory blockchain smart contract 106 prompts the user of client computing device 110, via inventory application 112, to register the storage location. In one embodiment, inventory blockchain smart contract 106 requires the user of client computing device 110 to be authorized to register a new storage location. In the embodiment, inventory blockchain smart contract 106 may authorize a user by receiving one or more credentials of the user from inventory application 112. In one embodiment, the user of client computing device 110 registers the storage location, via inventory application 112, by typing a name of the storage location. In an embodiment, inventory blockchain smart contract 106 may suggest to the user, via inventory application 112, to affix a fiducial, for example, a QR code, to the storage location such that the storage location can be easily identified in future images.

Inventory blockchain smart contract 106 determines an initial inventory (step 238). Inventory blockchain smart contract 106 determines an inventory count of the image of the newly registered storage location as described with respect to step 228.

Responsive to determining the initial inventory, or responsive to tagging the image as valid, inventory blockchain smart contract 106 submits the inventory count to blockchain ledger 108 (step 242). In the scenario where inventory blockchain smart contract 106 has just determined an initial inventory count, inventory blockchain smart contract 106 submits the initial inventory count to blockchain ledger 108 in association with the newly registered storage location. In the scenario where inventory blockchain smart contract 106 determined a new inventory count, inventory blockchain smart contract 106 replaces the previous inventory count associated with a storage location with the new inventory count in blockchain ledger 108. In one embodiment, inventory blockchain smart contract 106 monitors image submissions by storage location and waits until a pre-defined threshold quantity of image submissions is received prior to submitting the inventory count to blockchain ledger 108.

Inventory blockchain smart contract 106 takes action (step 244). In response to determining an inventory count, inventory blockchain smart contract 106 may take one or more of a plurality of actions. In an embodiment, actions may include sending a notice or alert to one or more users of inventory application 112 of the status of the inventory. An alert to a user responsible for stocking the storage location may include a list of specific items for which the inventory is depleted or below an acceptable threshold quantity. In another embodiment, if inventory blockchain smart contract 106 determines one or more items are depleted or below an acceptable threshold quantity, then inventory blockchain smart contract 106 automatically places an order for the one or more items from a supplier. For example, if inventory blockchain smart contract 106 determines the quantity of pencils in a supply cabinet is below a pre-defined threshold quantity, such as ten, then inventory blockchain smart contract 106 automatically places an order for pencils. In a further embodiment, if inventory blockchain smart contract 106 determines an item remains in inventory past the useful life of the item, e.g., an expiration date, then inventory blockchain smart contract 106 can notify the owner of the item or the user responsible for the storage location to remove the item from the storage location. For example, if inventory blockchain smart contract 106 determines a user's personal food item has been in the company refrigerator for longer than a maximum stay, a policy defined by the company, then inventory blockchain smart contract 106 sends a notification to the owner of the item, if known, or to the user responsible for monitoring the refrigerator contents. In yet another embodiment, inventory blockchain smart contract 106 may offer incentives to one or more users to continue submitting images. For example, inventory blockchain smart contract 106 may offer a free item from the storage location for every ten images submitted over a pre-defined period of time. In an embodiment where inventory blockchain smart contract 106 determined an image is invalid, inventory blockchain smart contract 106 may notify the user that submitted the image that it was invalid and give one or more reasons why the image was invalid, in order to improve the user's future submissions. In another embodiment, inventory blockchain smart contract 106 may monitor frequency of image submissions by users, and if a user's image submissions fall below a pre-defined threshold rate, then inventory blockchain smart contract 106 may notify the user of an incentive to increase the rate of submissions.

In an embodiment, inventory blockchain smart contract 106 takes action in response to a user request. For example, if a user wants to see the current contents of a company refrigerator to determine if the user's favorite brand of soda is in stock, then inventory blockchain smart contract 106 may receive a request from the user, via inventory application 112, and display the most recent image of the contents of the refrigerator in response to the request. In an embodiment, in response to a request or as part of a notification or alert, inventory blockchain smart contract 106 may display a textual overlay with an image that points out additional information. For example, inventory blockchain smart contract 106 may superimpose an arrow and text over a received image to indicate one or more products missing from a shelf. In another example, inventory blockchain smart contract 106 may overlay text on the image that indicates a product remaining on the shelf that has passed the associated expiration date.

Figure 3:
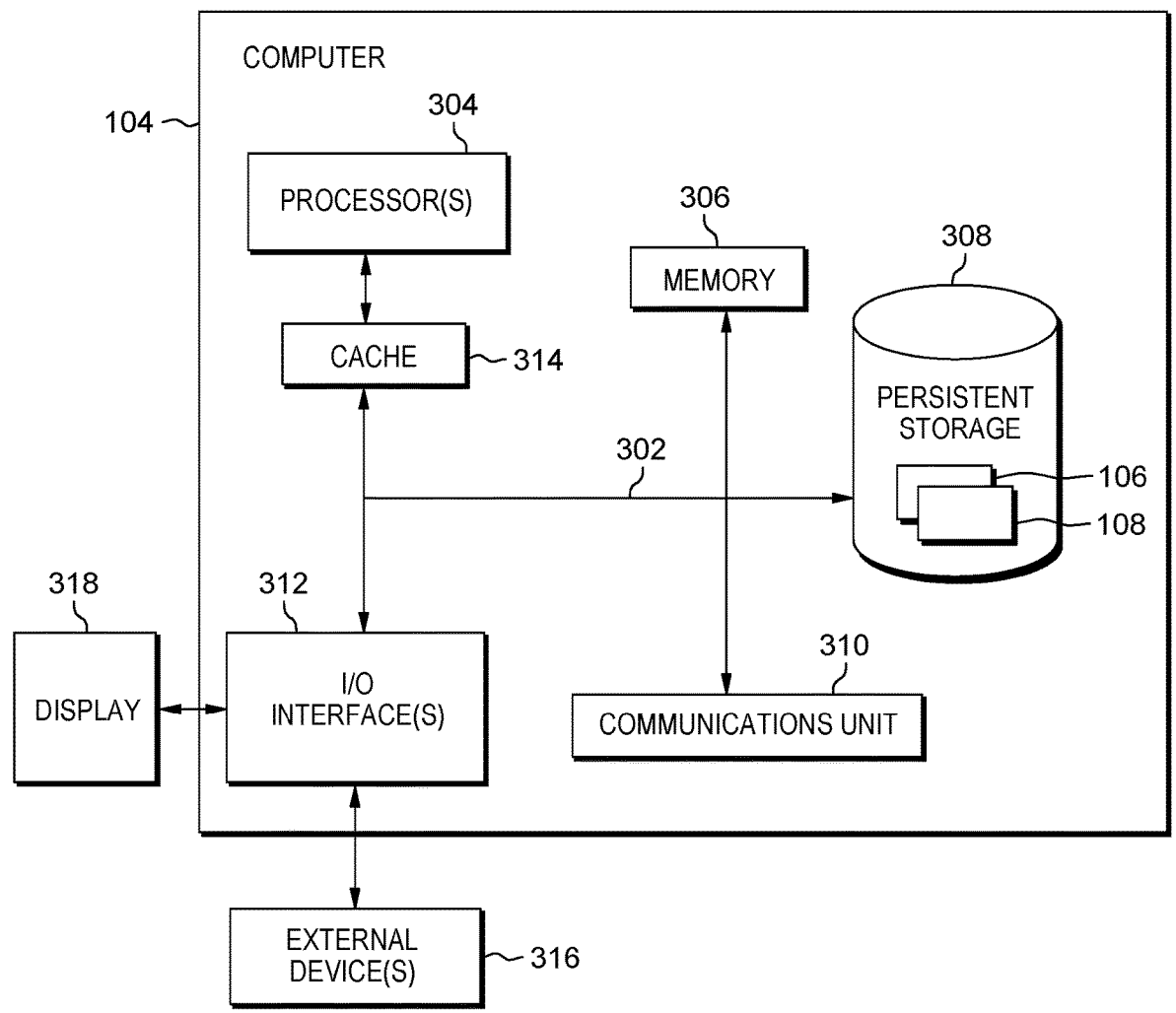
FIG. 3 depicts a block diagram of components of the server computer executing the inventory blockchain smart contract within the distributed data processing environment of FIG. 1, in accordance with an embodiment of the present invention.

FIG. 3 depicts a block diagram of components of server computer 104 executing inventory blockchain smart contract 106 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., inventory blockchain smart contract 106 and blockchain ledger 108, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 110. In these examples, communications unit 310 includes one or more network interface cards. Communications unit 310 may provide communications through the use of either or both physical and wireless communications links. Inventory blockchain smart contract 106, blockchain ledger 108, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., inventory blockchain smart contract 106 and blockchain ledger 108 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to determining, by one or more computer processors, a device of a user that includes a camera is within a pre-defined threshold distance of a storage location, triggering, by one or more computer processors, the camera to capture a first image of one or more products in the storage location;
   receiving, by one or more computer processors, the first image of the one or more products from the device of the user;
   removing, by one or more computer processors, data associated with an identity of the user from the first image;
   determining, by one or more computer processors, that a storage location associated with the one or more products is detected in the first image;
   determining, by one or more computer processors, an inventory count of the one or more products in the first image;
   submitting, by one or more computer processors, the first image and the inventory count of the one or more products in the first image to a blockchain ledger in association with the storage location;
   taking, by one or more computer processors, an action based on the inventory count;
   comparing, by one or more computer processors, the inventory count to a previous inventory state of the storage location;
   based on the comparison, determining, by one or more computer processors, whether the inventory count is valid;
   responsive to determining the inventory count is valid, tagging, by one or more computer processors, the first image as valid; and responsive to determining the inventory count is invalid, tagging, by one or more computer processors, the first image as invalid.

2. The method of claim 1, wherein determining that the storage location associated with the one or more products is detected in the first image comprises:
   determining, by one or more computer processors, whether one or more fiducials are detected in the first image; and
   responsive to determining the one or more fiducials are detected in the first image, retrieving, by one or more computer processors, location data from the one or more fiducials.

3. The method of claim 1, wherein determining that the storage location associated with the one or more products is detected in the first image comprises:
   retrieving, by one or more computer processors, metadata from the first image;
   determining, by one or more computer processors, whether the metadata includes location data; and
   responsive to determining the metadata includes the location data, retrieving, by one or more computer processors, the location data from the metadata.

4. The method of claim 1, wherein determining that the storage location associated with the one or more products is detected in the first image comprises:
   determining, by one or more computer processors, whether one or more tags associated with the first image are detected, wherein the one or more tags include location data; and
   responsive to determining the one or more tags associated with the first image are detected, retrieving, by one or more computer processors, location data from the one or more tags.

5. The method of claim 1, wherein determining that the storage location associated with the one or more products is detected in the first image comprises:
   fetching, by one or more computer processors, one or more images of one or more storage locations from the blockchain ledger;
   determining, by one or more computer processors, whether a match of the first image to at least one of the one or more fetched images is detected; and
   responsive to determining a match of the first image to at least one of the one or more fetched images is detected, determining, by one or more computer processors, the storage location associated with the one or more products in the first image based on the match of the first image to at least one of the one or more fetched images.

6. The method of claim 1, further comprising:
   responsive to determining that the storage location associated with the one or more products is not detected in the first image, receiving, by one or more computer processors, a registration of the storage location from the user; and
   determining, by one or more computer processors, an initial inventory count associated with the registered location.

7. The method of claim 1, wherein the action is selected from the group consisting of: sending a notification to one or more users, sending an alert to one or more users, placing an order for the one or more products, offering one or more incentives to one or more users, monitoring a frequency of image submissions by one or more users, responding to a user request, displaying the inventory count, and displaying an overlay with an image.

8. A computer program product, the computer program product comprising:
   one or more computer readable storage devices and program instructions stored on the one or more computer readable storage devices, the stored program instructions comprising:
   program instructions to determine a device of a user that includes a camera is within a pre-defined threshold distance of a storage location;
   program instructions to, responsive to determining the device of the user is within the predefined threshold distance, trigger the camera to capture a first image of one or more products in the storage location;

program instructions to receive the first image of the one or more products from the device of the user;

program instructions to remove data associated with an identity of the user from the first image;

program instructions to determine that a storage location associated with the one or more products in the first image is detected in the first image;

program instructions to determine an inventory count of the one or more products in the first image;

program instructions to submit the first image and the inventory count of the one or more products in the first image to a blockcha in ledger in association with the storage location;

program instructions to take an action based on the inventory count;

program instructions to compare the inventory count to a previous inventory state of the storage location;

based on the comparison, program instructions to determine whether the inventory count is valid;

responsive to determining the inventory count is valid, program instructions to tag the first image as valid; and responsive to determining the inventory count is invalid, program instructions to tag the first image as invalid.

9. The computer program product of claim 8, wherein the program instructions to determine that the storage location associated with the one or more products is detected in the first image comprise:

program instructions to determine whether one or more fiducials are detected in the first image; and responsive to determining the one or more fiducials are detected in the first image, program instructions to retrieve location data from the one or more fiducials.

10. The computer program product of claim 8, wherein the program instructions to determine that the storage location associated with the one or more products is detected in the first image comprise:

program instructions to retrieve metadata from the first image;

program instructions to determine whether the metadata includes location data; and responsive to determining the metadata includes the location data, program instructions to retrieve the location data from the metadata.

11. The computer program product of claim 8, wherein the program instructions to determine that the storage location associated with the one or more products is detected in the first image comprise:

program instructions to determine whether one or more tags associated with the first image are detected, wherein the one or more tags include location data; and responsive to determining the one or more tags associated with the first image are detected, program instructions to retrieve location data from the one or more tags.

12. The computer program product of claim 8, wherein the program instructions to determine that the storage location associated with the one or more products is detected in the first image comprise:

program instructions to fetch one or more images of one or more storage locations from the blockchain ledger;

program instructions to determine whether a match of the first image to at least one of the one or more fetched images is detected; and responsive to determining a match of the first image to at least one of the one or more fetched images is detected, program instructions to determine the storage location associated with the one or more products in the first image based on the match of the first image to at least one of the one or more fetched images.

13. A computer system, the computer system comprising:

one or more computer processors;

one or more computer readable storage devices;

program instructions stored on the one or more computer readable storage devices for execution by at least one of the one or more computer processors, the stored program instructions comprising:

program instructions to determine a device of a user that includes a camera is within a pre-defined threshold distance of a storage location;

program instructions to, responsive to determining the device of the user is within the predefined threshold distance, trigger the camera to capture a first image of one or more products in the storage location;

program instructions to receive the first image of the one or more products from the device of the user;

program instructions to remove data associated with an identity of the user from the first image;

program instructions to determine that a storage location associated with the one or more products in the first image is detected in the first image;

program instructions to determine an inventory count of the one or more products in the first image;

program instructions to submit the first image and the inventory count of the one or more products in the first image to a blockchain ledger in association with the storage location;

program instructions to take an action based on the inventory count; program instructions to compare the inventory count to a previous inventory state of the storage location;

based on the comparison, program instructions to determine whether the inventory count is valid;

responsive to determining the inventory count is valid, program instructions to tag the first image as valid; and responsive to determining the inventory count is invalid, program instructions to tag the first image as invalid.

14. The computer system of claim 13, wherein the program instructions to determine that the storage location associated with the one or more products is detected in the first image comprise:

program instructions to determine whether one or more fiducials are detected in the first image; and responsive to determining the one or more fiducials are detected in the first image, program instructions to retrieve location data from the one or more fiducials.

15. The computer system of claim 13, wherein the program instructions to determine that the storage location associated with the one or more products is detected in the first image comprise:

program instructions to retrieve metadata from the first image;

program instructions to determine whether the metadata includes location data; and responsive to determining the metadata includes the location data, program instructions to retrieve the location data from the metadata.

16. The computer system of claim 13, wherein the program instructions to determine that the storage location associated with the one or more products is detected in the first image comprise:

program instructions to determine whether one or more tags associated with the first image are detected, wherein the one or more tags include location data; and responsive to determining the one or more tags associated with the first image are detected, program instructions to retrieve location data from the one or more tags.

17. The computer system of claim 13, wherein the program instructions to determine that the storage location associated with the one or more products is detected in the first image comprise:
- program instructions to fetch one or more images of one or more storage locations from the blockchain ledger;
- program instructions to determine whether a match of the first image to at least one of the one or more fetched images is detected; and
- responsive to determining a match of the first image to at least one of the one or more fetched images is detected, program instructions to determine the storage location associated with the one or more products in the first image based on the match of the first image to at least one of the one or more fetched images.

\* \* \* \* \*